(12) United States Patent
Longginou et al.

(10) Patent No.: US 7,853,252 B1
(45) Date of Patent: Dec. 14, 2010

(54) POSITIONING SYSTEMS UTILIZING MOBILE TELEPHONE SYSTEM FOR CORRECTION SIGNALS

(75) Inventors: Lucas Longginou, Hamilton (AU); Miles P. Moody, Ascot (AU)

(73) Assignee: Voxson Pty Ltd., Brisbane, Queensland (AU)

( * ) Notice: Subject to any disclaimer, the term of this patent is extended or adjusted under 35 U.S.C. 154(b) by 0 days.

(21) Appl. No.: 08/782,578

(22) Filed: Jan. 13, 1997

Related U.S. Application Data

(63) Continuation of application No. 08/454,313, filed on Nov. 13, 1995, now abandoned.

(51) Int. Cl.
*H04W 4/00* (2009.01)
*H04W 24/00* (2009.01)

(52) U.S. Cl. .................... 455/426.1; 455/456.1

(58) Field of Classification Search ............ 379/58, 379/59, 60, 63; 342/357, 350, 352, 357.03, 342/357.02, 357.06, 357.07, 357.08, 357.09, 342/357.1, 357.13, 358, 457, 454; 364/449; 455/403, 427, 430, 456, 456.1, 434, 456.6; 370/324

See application file for complete search history.

(56) References Cited

U.S. PATENT DOCUMENTS

| | | | |
|---|---|---|---|
| 4,445,118 A | | 4/1984 | Taylor |
| 4,751,512 A | * | 6/1988 | Longaker ............... 342/357.03 |
| 4,870,422 A | * | 9/1989 | Counselman, III .......... 342/357 |
| 4,914,651 A | * | 4/1990 | Lusignan .................. 379/59 X |
| 5,043,736 A | * | 8/1991 | Darnell et al. ........... 342/357.1 |
| 5,223,844 A | * | 6/1993 | Mansell et al. ......... 342/357.07 |
| 5,225,842 A | * | 7/1993 | Brown et al. ................. 342/357 |
| 5,323,322 A | * | 6/1994 | Mueller et al. .......... 342/357 X |
| 5,345,245 A | * | 9/1994 | Ishikawa et al. ............ 342/357 |
| 5,432,841 A | * | 7/1995 | Rimer ........................ 455/457 |

FOREIGN PATENT DOCUMENTS

| | | | | |
|---|---|---|---|---|
| GB | 2264837 | * | 8/1993 | ............ 342/357.03 |
| WO | WO 89/12835 | * | 12/1989 | ............ 342/357.03 |

OTHER PUBLICATIONS

Blackwell, Earl. G. Overview of Differential GPS Methods. Global Positioning System, vol. III, pp. 89-100, 1986.*
"RTCM Recommended Standards for Differential Navstar GPS Service", Jan. 1, 1990, Version 2.0, RTCM Special Committee No. 104, RTCM Paper 134-89/SC 104-68.

* cited by examiner

*Primary Examiner*—George Eng
*Assistant Examiner*—Michael Faragalla
(74) *Attorney, Agent, or Firm*—Jones Day

(57) ABSTRACT

A positioning system where receiving stations such as multipurpose mobile communications devices can calculate their position. The system includes base stations adapted to receive position information from the receiving stations over a communications path of a mobile telephone system. The system allows the receiving stations to receive a correction signal from a correction station over the communications path on a special signaling layer such that the receiving stations can calculate a corrected position. The system can be used in conjunction with many forms of mobile telephone systems.

19 Claims, 7 Drawing Sheets

POSITIONING SYSTEMS UTILIZING MOBILE TELEPHONE SYSTEM FOR CORRECTION SIGNALS

This application is a Continuation 37 C.F.R. 1.62 of prior application Ser. No. 08/454,313, filed one Nov. 13, 1995 now abandoned.

FIELD OF THE INVENTION

The present invention relates to improvements in global positioning systems and, more particularly, to systems which can report a combination of location and identification information to an external source.

BACKGROUND ART

A number of promising technologies have emerged in the communications domain in recent years. The technologies include navigation with the aid of satellites and the conversion of mobile radio systems to mobile telephone systems, trunked radio and personal communications systems. The challenge is to make these technologies available in useable form.

These new systems themselves take a number of forms. For example there exists a geographically wide spread cellular network (for example, in Australia, there exists the Mobilenet (TM Telecom) administered by Telecom Australia). This network will hereafter be referred to as the cellular mobile telephone communication network.

Another of the new forms of mobile telephone is the trunked radio system which, in principle, operates along much the same lines as the cellular mobile telephone communication network to the extent that it comprises a series of radio transmitter/receiver stations distributed over a geographical area and interlinked in a manner whereby vehicle mounted or otherwise transportable corresponding radio transmitter/receiver units can communicate with (usually) the closest one of the distributed transmitter/receiver stations. All of the geographically distributed transmitter/receiver stations are interlinked so that communications across the network are effectively unified. The trunked radio system is utilised typically for specialised communication networks such as taxi communication networks or courier communication networks. Messages required to be sent over the trunked radio network are typically much shorter than those required to be sent over the cellular mobile telephone communication network and the trunked radio system is usually also tailored so that the cost of communication is less than for the cellular mobile telephone communication network.

Yet another form of the mobile telephone system is a personal communication system wherein the geographically distributed transmitter/receiver stations have only a limited range and for a mobile mounted or otherwise transportable transmitter/receiver to communicate with these stations requires that the transportable transmitter/receiver be within a specified distance of one of the distributed transmitter/receiver stations. These localised communication systems are frequently used in densely populated areas and require users to approach within a specified distance of easily identifiable transmitter/receiver stations before communication on the personal communication system can take place.

DISCLOSURE OF THE INVENTION

Throughout the specification a reference to a "mobile telephone system" is a reference to any one of these systems. That is the term "mobile telephone system" embraces the cellular mobile telephone communication network, a trunked radio system and the personal communication system arrangements.

Accordingly, in one broad form of the invention, there is provided a system for tracking the location of vehicles and the like, said system comprising local positioning information supply means which corrects positioning information received from satellites so as to produce a local positioning information signal; said system further comprising mobile telephone system which transmits said local positioning information signal to said vehicles and the like.

Preferably said mobile telephone system additionally contributes information to said system.

Preferably said local positioning information signal is transmitted as part of a control layer signal or messaging signal on said mobile telephone system for reception by a mobile telephone receiver which further includes differential global positioning means whereby a physical location in three dimensions of said receiver is obtained. Any such control layer or messaging signal will be hereinafter referred to as the "special signalling layer".

Preferably said positioning information together with identity information is transmitted from said mobile telephone receiver back over said special signalling layer to database means whereby position, identity and other derived information for a plurality of like mobile receivers can be monitored at a remote location.

In a further broad form of the invention there is provided a mobile telephone system transmitter/receiver including global position calculating means.

Preferably said global position calculating means is adapted to utilise a differential GPS correction signal whereby relatively accurate position information can be derived by said global position calculating means.

Preferably said differential GPS correction signal is transmitted on a special signalling layer of a communications path provided by a mobile telephone system of which said mobile telephone system transmitter/receiver forms a part.

In a further broad form of the invention there is provided a global positioning system wherein receiving stations are adapted to receive raw positioning information and thereby calculate a position for said receiving stations; said system further including base stations adapted to receive data comprising said position and wherein said data is transmitted over a communications path of a mobile telephone system.

Preferably said data is transmitted over a special signalling layer of said communications path.

In one particular preferred form said mobile telephone system comprises the cellular network system described above.

In an alternative particular form said mobile telephone system comprises the trunked radio system described above.

In yet a further particular preferred form said mobile telephone system comprises the personal communications system described above.

Preferably additional data is supplied over said communications path to said receiving stations, said additional information comprising local positioning information; said local positioning information allowing said receiving stations to calculate a corrected position based on said local positioning information.

Preferably said receiving stations, on request from said base stations, calculate and transmit only said position to said base stations.

In an alternative preferred form, on request from said base stations, said receiving stations, calculate and transmit said corrected position.

In a particular preferred form said data additionally includes satellite identification data comprising the identity of satellites from which said receiving stations have received said raw positioning information.

BRIEF DESCRIPTION OF THE DRAWINGS

Embodiments of the invention will now be described with reference to the accompanying drawings wherein:—

MODES FOR CARRYING OUT THE INVENTION

Figure 1:
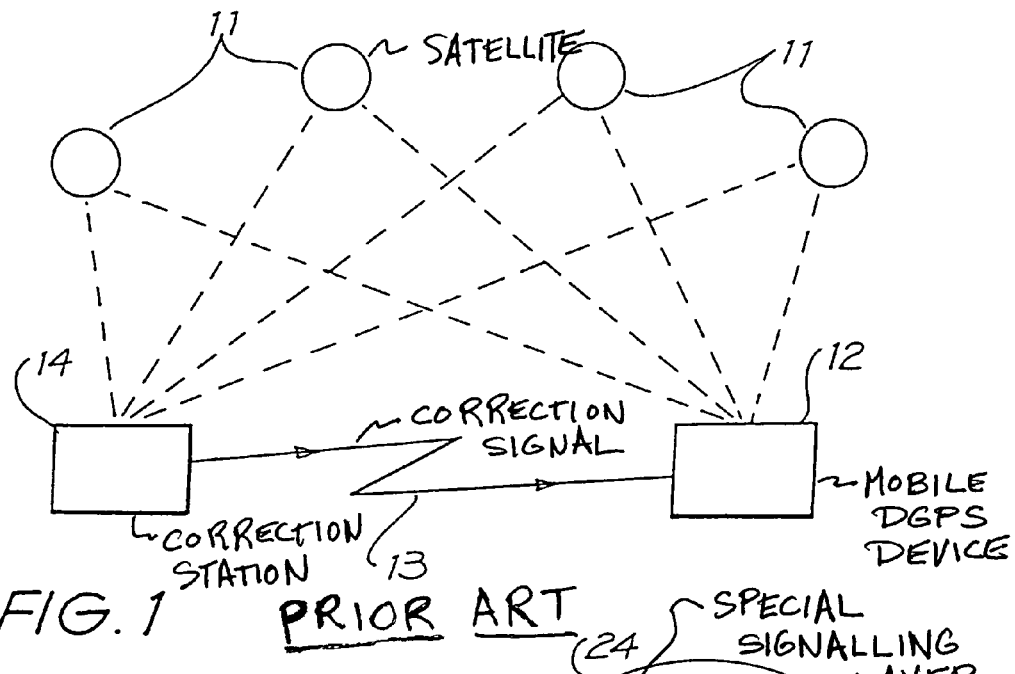
FIG. 1 is a diagram of a basic global positioning system.

By way of reference, FIG. 1 illustrates the basic method of operation of a differential global positioning system which utilises information from satellites 11. With this arrangement a portable differential global positioning device 12 is adapted to receive signals from typically four satellites 11 and, from this information, calculate its position in three dimensions to the order of 100 meters. With the help of a correction signal 13 provided from a land based correction station 14 the differential global positioning device 12 can establish its position in three dimensions to the order of one meter. Currently such systems rely predominantly on radio transmission to relay the correction signal 13 from the correction station 14 to the mobile differential global positioning device 12.

Figure 2:
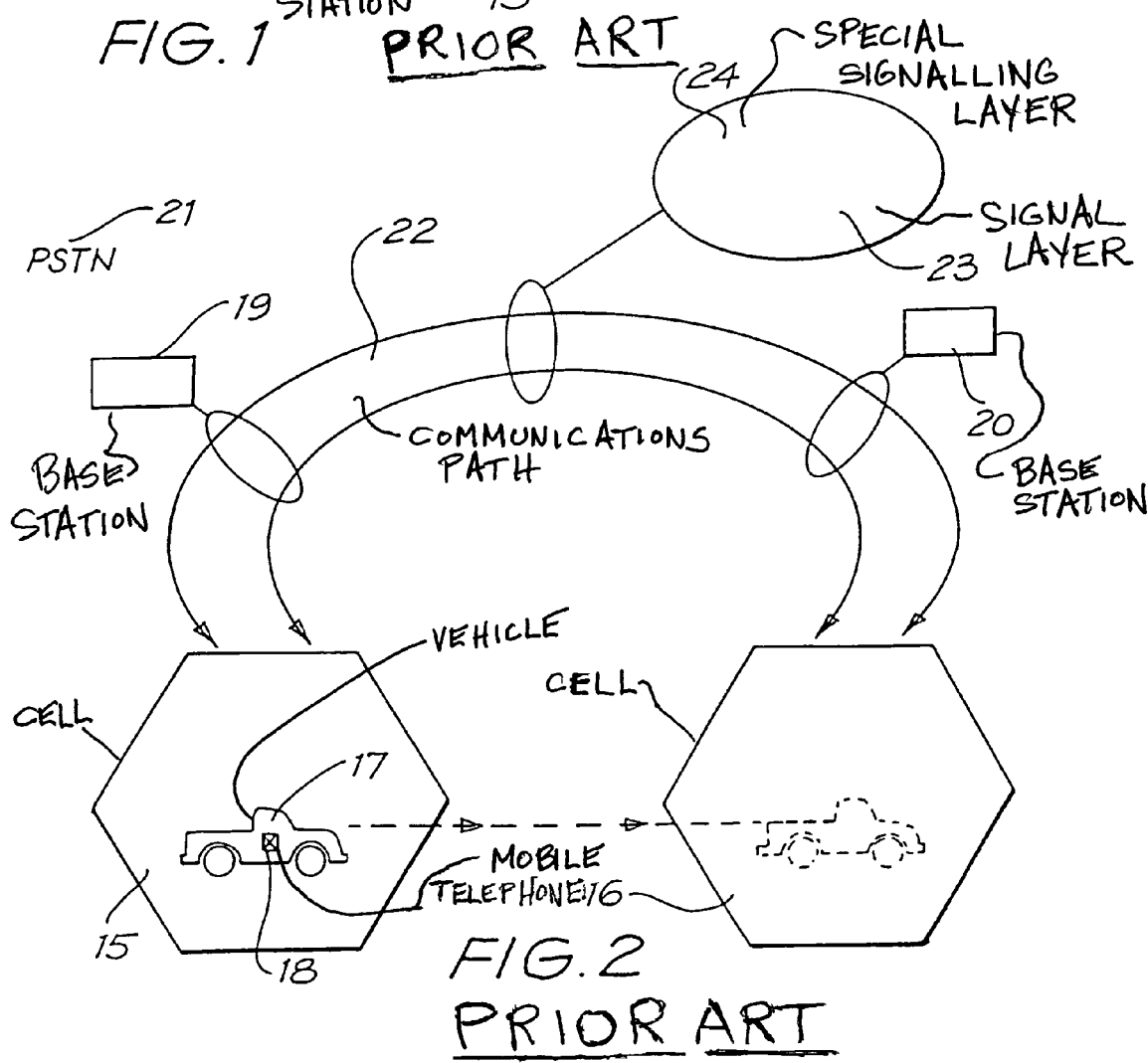
FIG. 2 is a diagram of a basic mobile telephone network.

FIG. 2 is a conceptual illustration of a portion of a mobile telephone system showing two adjacent cells 15, 16 and a car 17 equipped with a mobile phone 18 passing between those two cells 15, 16. A radio based communications system including base stations 19, 20 allows two way communication between the mobile telephone 18 and the public switched telephone network 21. More particularly the mobile phone system allows such two way communications to continue as the mobile phone 18 passes from cell 15 to cell 16. The transfer of the telephone call from one cell to another is accomplished by appropriate control equipment located in base stations 19, 20 and relies upon a radio based communications system incorporating a communications path 22 which is split into at least a signal layer 23 and a control layer. The special signalling layer 24 includes the control layer which transmits information to do with the administration of the telephone call being conducted on mobile phone 18 including such things as the identity of the mobile telephone together with necessary information which allows transfer of communication in respect of the mobile phone 18 from cell 15 to cell 16. The special signalling layer 24 can be unmetered and continuous. The communications path 22 also includes a signal layer 23 which transmits the information which a user of the telephone system desires to pass to an end user from the mobile telephone 18. This information is metered in normal circumstances.

The mobile telephone system illustrated in FIG. 2 allows communications between any two mobile telephones such as telephone 18. It also allows communication between a mobile telephone 18 and land based users of the public switched telephone network 21.

The special signalling layer can reside entirely within the control layer or can be interleaved across the control layer and the signal layer.

Figure 3:
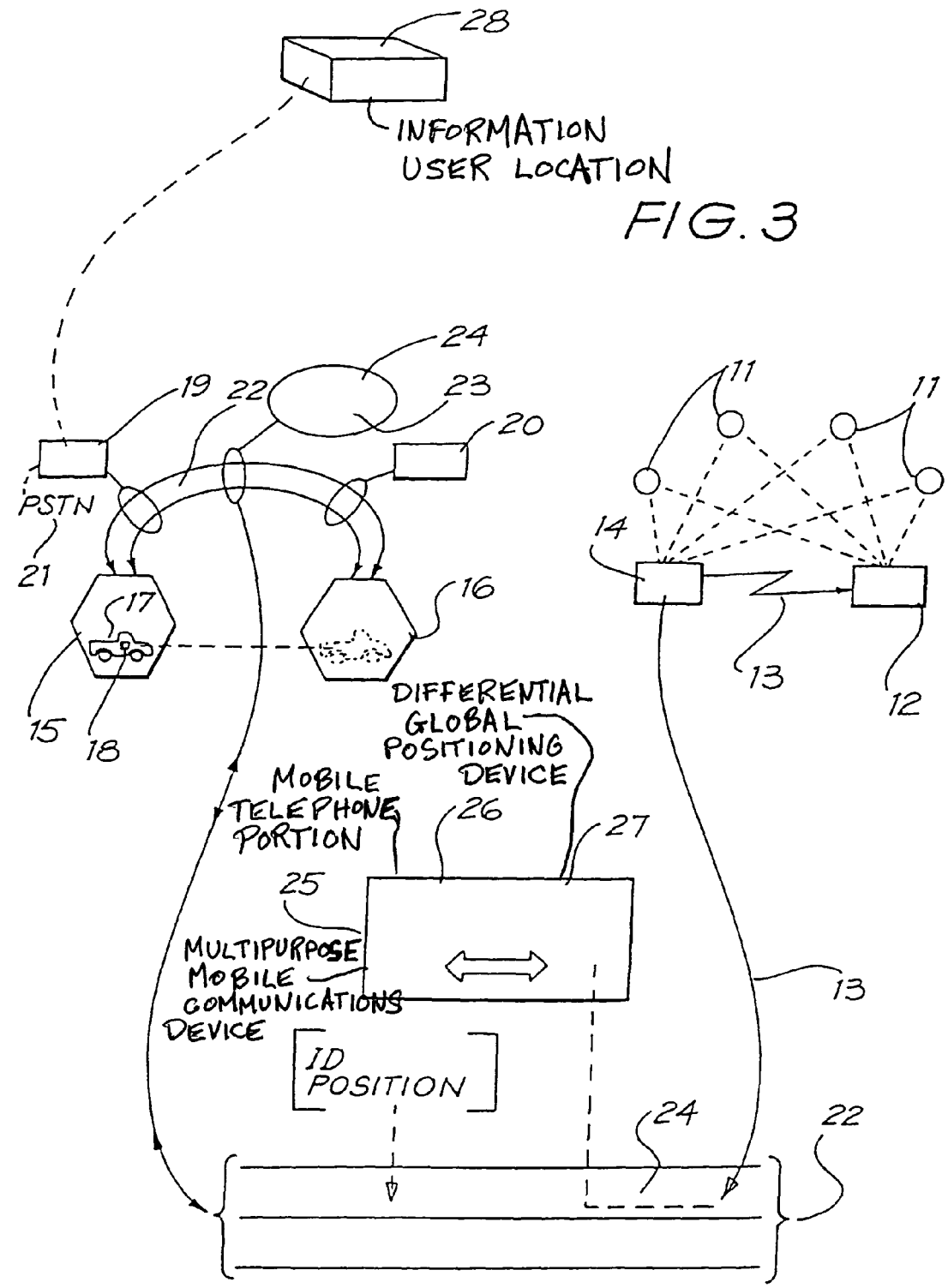
FIG. 3 is a diagram of a first embodiment of the present invention incorporated within a cellular mobile telephone communication network.

FIG. 3 illustrates a first embodiment of the present invention comprising a multipurpose mobile communications device 25 which includes a mobile telephone portion 26 and a differential global positioning device 27.

In the arrangement illustrated in FIG. 3 correction signal 13 is made available on special signalling layer 24 for reception by the differential GPS portion 27 of communications device 25. With this information, and as described with reference to FIG. 1 the differential GPS portion 27 can calculate a relatively accurate position in three dimensions for the communications device 25. This information together with identity information of the communications device 25 is returned to the special signalling layer 24 for transmission via the public switched telephone network or dedicated line 21 to an information user location 28.

It will be noted with this arrangement that at least identity and position information can be passed between communications device 25 and an information user location 28 by utilising preexisting communications channels available on a mobile telephone system of the type illustrated in respect of FIG. 2.

Figure 4:
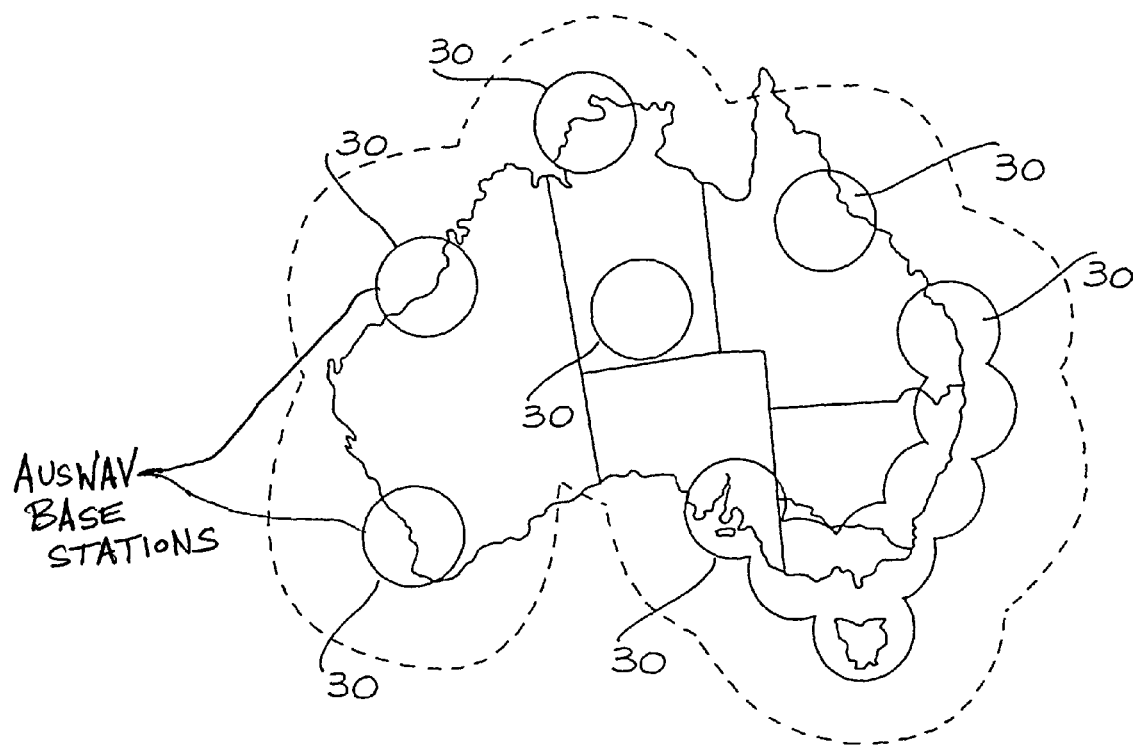
FIG. 4 illustrates an arrangement of correction signal generating stations for a differential global positioning system for use in conjunction with a second embodiment of the present invention incorporated within the cellular network of FIG. 3.
Figure 4:
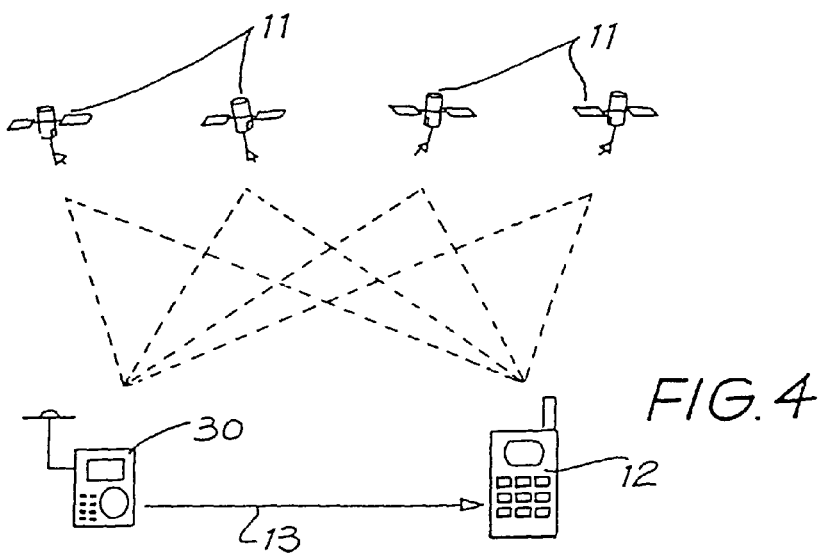

FIG. 4 illustrates a geographical layout of proposed Ausnav base stations 30. As illustrated in the inset, each of these Ausnav base stations 30 can receive global positioning information from satellites 11, each Ausnav base station 30 is at a known physical location in three dimensions and uses this information to produce correction signal 13 for reception by a mobile differential global positioning device 12. Other similar base stations 30 could be supplied by other providers of differential correction information.

The differential GPS device 12 calculates its position as follows:

1. Using a data base of orbital coefficients (the almanac), the set of currently visible satellites is determined.
2. Using the almanac, a set of four satellites is selected based on a geometric criterion.
3. The receiver is synchronised to the signals from the selected satellites and the precise satellite position is computed.
4. The time of receipt of the signal from each satellite is measured and the time of transmission is extracted from the message to give time-of-flight and hence satellite-to-receiver distance or "pseudorange".
5. The receiver position is then computed by "triangulation".

Figure 5:
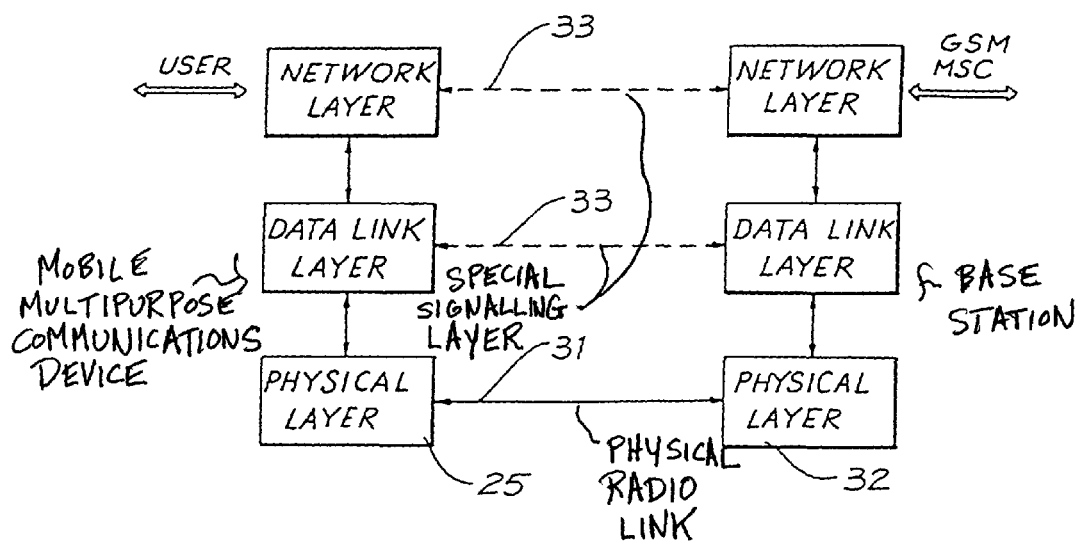
FIG. 5 is a block diagram of the communications interconnection protocol between a mobile station and a base system station according to the second embodiment of the invention.
Figure 6:
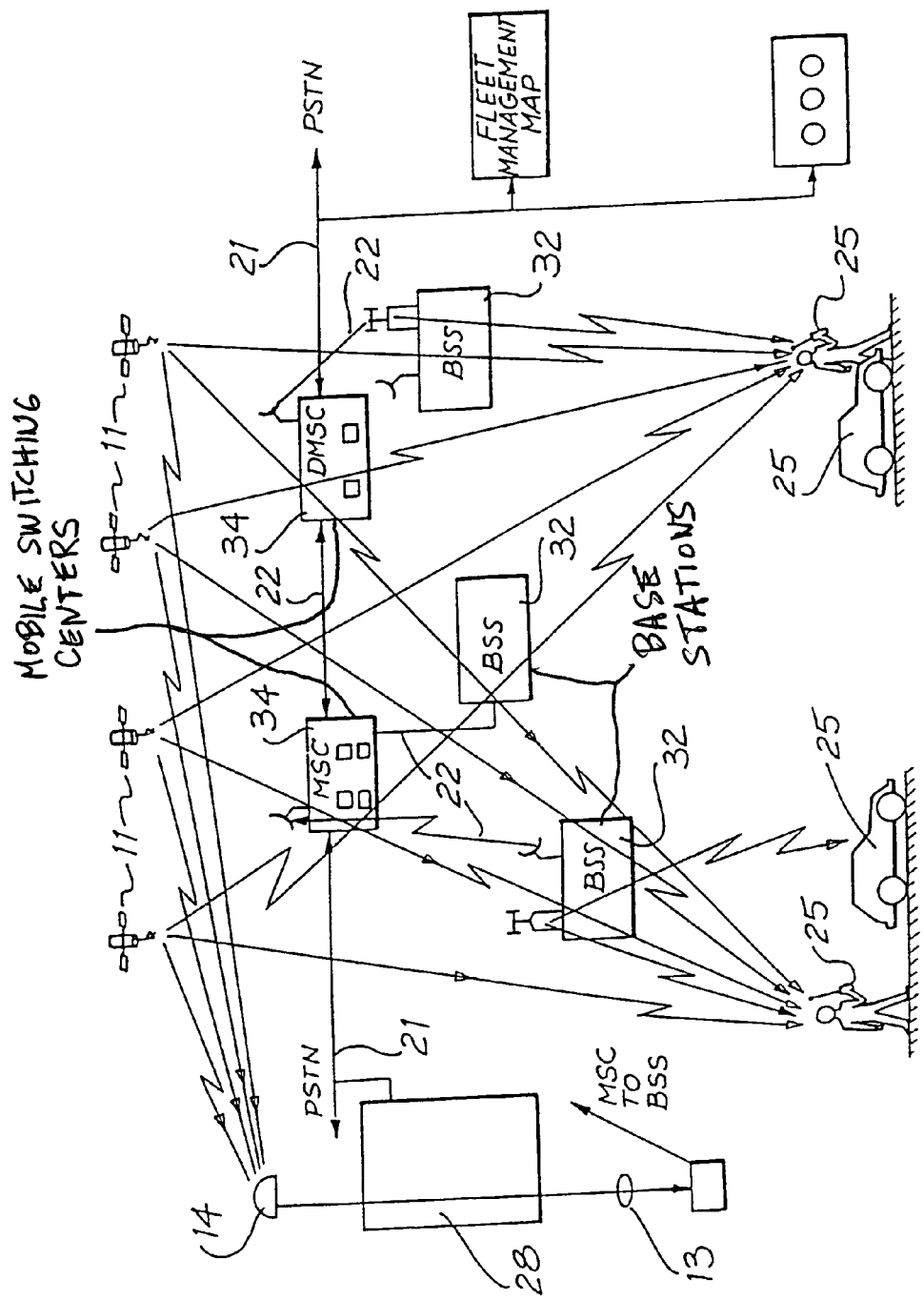
FIG. 6 is a block diagram of a particular manner of usage of the mobile station and base system station of FIG. 5.

FIGS. 5 and 6 illustrate how the differential global positioning arrangement of FIG. 4 is incorporated into a mobile telephone system.

With reference to FIG. 5 a physical radio link 31 is established between a mobile multipurpose communications device 25 and at least one of a plurality of base stations 32. The physical radio link 31 allows data such as identity and position information to be transmitted between the communications device 25 and the base station 32.

In addition there is at least one special signalling layer 33 for supervisory functions between the communications device 25 and the base station 32.

These layers are superimposed upon the special signalling layer 24 and the signal layer 23 can be superimposed on and transmitted by the communications path 22 of the mobile telephone network (refer FIG. 2). In a particular preferred form conversation information and the like is passed along the signal layer 23 (and is therefore metered) whilst the correction signal 13, the resulting location signal generated by the communications device 25 and identity information is passed on special signalling layer 24 (which is not normally metered and which may be operational irrespective of whether the signal layer 23 is operational).

FIG. 6 illustrates the resulting superimposed system which has the following attributes:

A network of mobile communication devices 25 is interconnected with the public switched telephone network as illustrated. Each mobile telephone communications device 25 includes a mobile telephone portion 26 and a differential GPS portion 27 (refer FIG. 3).

An Ausnav or similar correction signal 13 is transmitted to a mobile switching centre 34 for transmission over control layer 24 of communications path 22 to base stations 32 and from there to the mobile communications devices 25. With this information and with identity information the mobile communications devices 25 can periodically report their position in three dimensions and their identity back via special signalling layer 24 of communications path 22 and from there, via the public switched telephone network 21 to an operational station such as, for example, a fleet management station which can thereby monitor location and progress of the mobile communications devices 25 in real time.

There are three major modes of operation for the system of FIG. 6. In a first mode a request is made by an operational station for one or more mobile communications devices 25 to send immediately over communications path 22 uncorrected position information. The second mode of operation is, similar to the first mode except that a request is made to send uncorrected position information together with satellite numbers or other identification of the satellites which are used by the mobile communications device 25 to calculate the uncorrected position information. In a third mode of operation a request is made for corrected position information. In this case the DGPS portion 27 calculates a corrected position and the mobile communications device 25 causes the corrected position information and identification information to be sent back to the requesting operation station.

Figure 7:
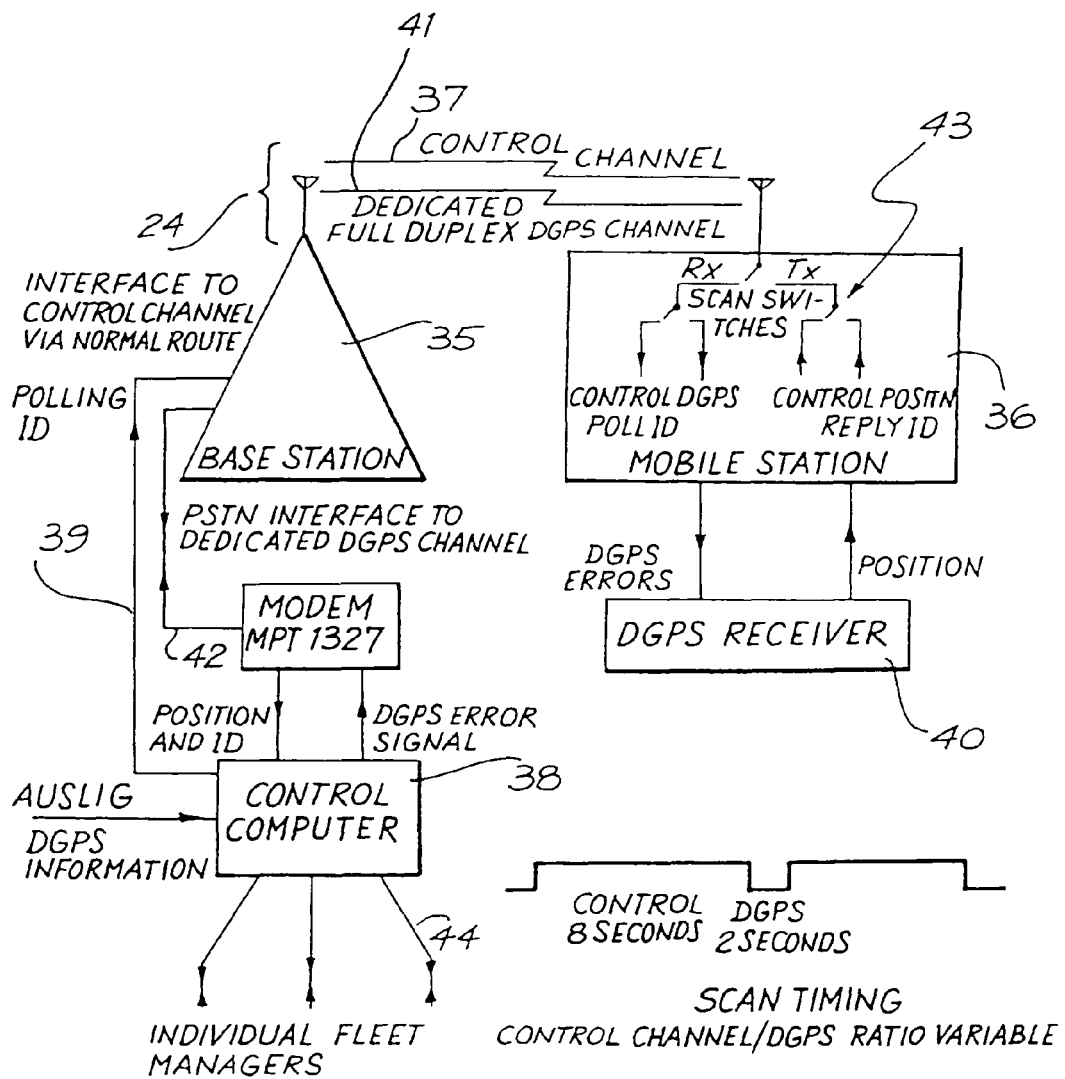
FIG. 7 is a block diagram of a third embodiment of the present invention incorporated within a trunked radio system.

With reference to FIG. 7 a trunked radio system embodiment of the invention is illustrated in block diagram form. A trunked radio system includes at least one (but typically, in practice, a plurality) base station 35 in communication with at least one mobile station 36 over a radio control channel 37. This "control" channel corresponds to the "special signalling layer" 24 to which reference has been made earlier in the specification.

The mobile station 36 is in communication via control channel 37 and a base station 35 with some form of centralised communications control system wherein messages received from mobile station 36 can be routed to a control centre, to other mobile stations or the PSTN 21 and, conversely, messages can be sent from other mobile stations or a control centre to the mobile station 36. In this particular example base station 35 is in communication with a control computer 38 via interface line 39. Depending on the implementation line 39 can be a direct dedicated link between base station 35 and control computer 38 and/or may pass through other public or private communication networks, or from another trunked radio.

According to this third embodiment of the invention the trunked radio system is modified by integration with a differential GPS navigation systems as follows:— mobile station 36 includes a DGPS receiver 40 (corresponding to DGPS device 12 described earlier in the specification) which utilises information received direct from satellite 11 together with correction information to provide information corresponding to the position of the DGPS 40. The correction information is derived from a dedicated channel 41 of the trunked radio system (corresponding to part of the "special signalling layer" 24 described earlier in this specification). Preferably the dedicated channel 41 bears a fixed relationship to control channel 37 such that once mobile station 36 has locked onto control channel 37 it can automatically locate and communicate with dedicated channel 41. Alternatively, the location of the dedicated channel may be communicated with the location request. The correction signal is communicated to dedicated channel 41 by base station 35 which, in turn, receives the correction signal from control computer 38 via modem communication over the public switched telephone network 42 (refer FIG. 7) or through a dedicated interface line such as 39.

A switching arrangement 43 allows mobile station 36 to switch between control channel 37 and dedicated channel 41 and also between receive and transmit modes of operation. This arrangement would typically be built into the trunked radio and controlled by signals over the channels 37 and 41.

In use, for example as part of a vehicle fleet, a fleet manager 44 having access to control computer 38 can lodge a request for location of a particular mobile station 36. The polling request is passed via interface line 39 to base station 35 and thence to control channel 37 for reception by mobile station 36. On receipt of the "request position" signal on channel 37 mobile station 36 will acknowledge the request via control channel 37 and then switch to the dedicated channel 41 so as to receive a correction signal. When this has been received correctly the mobile station (incorporating DGPS receiver 40) calculates its position and returns this on dedicated channel 41 together with identity information. This information is passed to control computer 38 for on forwarding to fleet manager 44.

Figure 8:
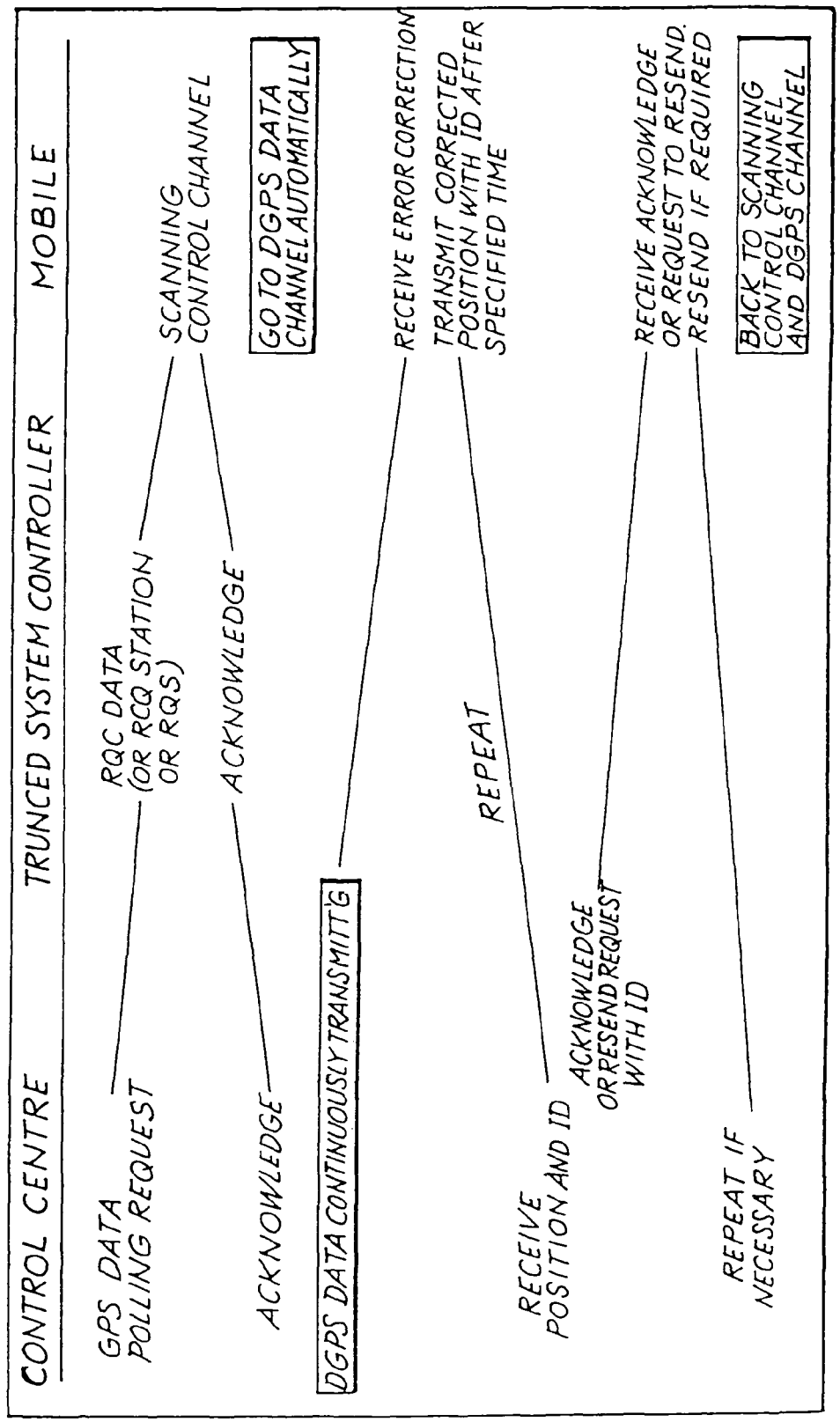
FIG. 8 is a timing diagram for the system of FIG. 7.

FIG. 8 provides additional detail on the methodology and signalling of a position request passing between base station 35 and mobile station 36.

In normal operation a mobile station 36, on switching on, will search for control channel 37. If the dedicated channel 41 can be related to the control channel 37 (for example the next adjacent channel) then the mobile station 36 will automatically know where to look for the DGPS error correction data. If this is not possible then a second search will have to be made for the dedicated channel 41 which carries the DGPS correction information. In one particular form the transmitted information will contain a bit pattern which can be uniquely recognised as being the identity of the dedicated channel 41. This procedure will have to be repeated each time mobile station 36 is transferred to a new base station 35. In another form, the identity of the dedicated channel can be communicated via the control channel 39.

Once having located both control channel 37 and dedicated channel 41 the mobile station 36 scans both channels listening for polling requests on control channel 37 and for DGPS error data on dedicated channel 41. The ratio of time spent on each channel can be related to the importance of the control information compared to the DGPS error information and, in a preferred form, can be programmable by the user. In this example two seconds is allocated to the dedicated channel 41 and eight seconds to the control channel 37.

When mobile station 36 receives a call on control channel 37 it performs normally, which is to say it passes information communicated by users between the mobile station 36 and the currently attached base station 35 over control channel 37. However, when a request to send location information is received then location and identity information is sent by mobile station 36 as described above after which the mobile station 36 reverts to normal operation.

INDUSTRIAL APPLICABILITY

The invention is particularly applicable for vehicle sleet control and the like where it is desired to know on a regular basis the geographical location of members of the fleet.

The above describes only some embodiments of the present invention and modifications obvious to those skilled in the art can be made thereto without departing from the scope and spirit of the present invention.

The invention claimed is:

1. A system for determining locations of mobile units including a cellular transceiver and a global positioning receiver used to determine the location of said mobile units using local positioning information using local position correction techniques, said system comprising:
   a) a communications path comprising at least two layers comprising a control layer and a signaling layer, said communications path further comprising a special signaling layer that can be unmetered and continuous, and said special signaling layer is characterized by one of (1) said special signaling layer resides entirely within said control layer, and (2) said special signaling layer is interleaved across said control layer and said signaling layer, and
   b) at least one base station configured to:
      i. receive a local position correction information signal from a local positioning information source, located at a known physical location, wherein the local position correction information signal is based on correcting position information derived from satellite signals;
      ii. transmit over the special signaling layer said local position correction information signal to said mobile units to enable a respective one of the mobile units to determine the location of said respective mobile unit using the local position correction information signal in conjunction with signals received from satellites by said respective mobile unit; and
      iii. receive, upon request, over the special signaling layer, from the respective mobile unit, mobile unit position information determined by the respective mobile unit based at least on a signal from the global positioning receiver, and mobile unit identity information;
   wherein said communications path comprises a dedicated channel that corresponds to a part of the special signaling layer, wherein the at least one base station is configured to both transmit the local position correction information to said mobile units over the dedicated channel, and to receive the mobile position information and the mobile unit identity information from said respective mobile unit over the dedicated channel.

2. The system of claim 1, in which the system is configured to receive additional information from a mobile telephone system.

3. The system of claim 1, in which at least one of the mobile units comprise a transmitter configured to transmit said position information and the mobile units' identity information to a database over said special signaling layer.

4. The system of claim 1, wherein the mobile unit position information comprises mobile unit corrected position information, wherein said mobile unit corrected position information is based at least in part on the local position correction information signal.

5. The system of claim 1, wherein said one mobile unit comprises a differential global positioning receiver adapted to utilize a differential global positioning system (DGPS) correction signal, wherein said mobile unit position information includes a DGPS correction signal that is transmitted over the special signaling layer of the communications path.

6. The system of claim 1, wherein the-system comprises a cellular network.

7. The system of claim 2, in which said additional information is received from mobile units over said special signaling layer.

8. The system of claim 1 in which the local position correction information signal comprises a differential global positioning system (DGPS) correction signal.

9. A method of determining a location of mobile units including global positioning receivers using local position correction techniques in a mobile telephone system comprising a communications path, the method comprising:
   a) receiving a local position correction information signal from a local positioning information source, located at a known location, wherein the local position correction information signal is based on correcting position information derived from satellite signals;
   b) transmitting said local position correction information signal to said mobile units over a special signaling layer to enable a respective one of the mobile units to determine the location of said respective mobile unit using the local position correction information signal in conjunction with signals received from satellites by said respective mobile unit; and
   c) receiving, upon request, over the special signaling layer, from the respective mobile unit, mobile unit position information determined by the respective mobile unit based at least on a signal from an associated global positioning receiver, and a mobile unit identity;
   wherein said communications path comprises at least two layers comprising a control layer and a signaling layer, said communications path further comprising said special signaling layer that can be unmetered and continuous, and said special signaling layer is characterized by one of (1) said special signaling layer resides entirely within said control layer, and (2) said special signaling layer is interleaved across said control layer and said signaling layer; and
   wherein said communications path comprises a dedicated channel that corresponds to a part of the special signaling layer, wherein the at least one base station is configured to both transmit the local position correction information to said mobile units over the dedicated channel, and to receive the mobile position information and the mobile unit identity information from said respective mobile unit over the dedicated channel.

10. The method as claimed in claim 9, in which the local positioning information source corrects position information derived from satellite signals to produce the local positioning information signal.

11. The method as claimed in claim 10 in which additional information is transmitted to the mobile units for them to determine their position.

12. The method as claimed in claim 11, further comprising the mobile units transmitting respective locations over the special signaling layer to a location database.

13. The method as claimed in claim 9 in which the local positioning information signal comprises a differential global positioning correction signal.

14. The method of claim 9, wherein at least one of the mobile units incorporate a global positioning device configured to determine a location of said mobile unit from satellite signals, wherein the mobile units transmit respective locations to a location database over the special signaling layer.

15. The system of claim 1, wherein the at least two layers comprise at least one pre-existing channel of a mobile telephone system.

16. The system of claim 5, wherein the at least two layers comprises at least one pre-existing channel of a mobile telephone system.

17. The method of claim 14, wherein the at least two layers comprise a pre-existing control channel of the mobile telephone system.

18. The system of claim 1, wherein the special signaling layer is unmetered and/or continuous.

19. The system of claim 1, wherein said dedicated channel comprises a dedicated full duplex differential global positioning system (DGPS) channel.

\* \* \* \* \*

UNITED STATES PATENT AND TRADEMARK OFFICE
CERTIFICATE OF CORRECTION

| | | |
|---|---|---|
| PATENT NO. | : 7,853,252 B1 | Page 1 of 1 |
| APPLICATION NO. | : 08/782578 | |
| DATED | : December 14, 2010 | |
| INVENTOR(S) | : Lucas Longginou and Miles P. Moody | |

It is certified that error appears in the above-identified patent and that said Letters Patent is hereby corrected as shown below:

On the title page, add item

(30)    Foreign Priority Application Data
       Dec. 2, 1992  (AU)  PL6157
       Jan. 18, 1993  (AU)  PL9495

On the title page, item (63) Related U.S. Application Data:

Delete "Continuation of application No. 08/454,313, filed on Nov. 13, 1995, now abandoned."

Insert --Continuation of application No. 08/454,313, filed on Nov. 13, 1995, now abandoned, which was a National Phase application of International Application No. PCT/AU93/00614, filed Dec. 1, 1993.--

Column 5, lines 25-26

Delete "control layer 24"
Insert --special signaling layer 24--

Column 7, line 16

Delete "sleet"
Insert --fleet--

Column 8, line 21

Delete "the-system"
Insert --the system--

Signed and Sealed this

Fifteenth Day of February, 2011

David J. Kappos
*Director of the United States Patent and Trademark Office*